United States Patent
Charbon

(10) Patent No.: US 10,795,317 B2
(45) Date of Patent: Oct. 6, 2020

(54) SPIRAL TIMEPIECE SPRING

(71) Applicant: Nivarox-FAR S.A., Le Locle (CH)

(72) Inventor: Christian Charbon, Chezard-St-Martin (CH)

(73) Assignee: Nivarox-FAR S.A., Le Locle (CH)

( * ) Notice: Subject to any disclaimer, the term of this patent is extended or adjusted under 35 U.S.C. 154(b) by 282 days.

(21) Appl. No.: 16/012,274

(22) Filed: Jun. 19, 2018

(65) Prior Publication Data
US 2018/0373202 A1 Dec. 27, 2018

(30) Foreign Application Priority Data

Jun. 26, 2017 (EP) ..................................... 17177906
Dec. 21, 2017 (CH) ..................................... 1593/17

(51) Int. Cl.
*G04B 17/06* (2006.01)
*G04B 1/14* (2006.01)
(Continued)

(52) U.S. Cl.
CPC ............. *G04B 17/066* (2013.01); *C21D 1/18* (2013.01); *C21D 9/02* (2013.01); *C22C 14/00* (2013.01);
(Continued)

(58) Field of Classification Search
CPC .... G04B 17/066; G04B 17/227; G04B 17/06; G04B 1/14; G04B 17/22; F16F 1/021;
(Continued)

(56) References Cited

U.S. PATENT DOCUMENTS

| 5,881,026 A * | 3/1999 | Baur ........................ C22C 27/02 148/501 |
| 6,607,693 B1 * | 8/2003 | Saito ........................ C22C 14/00 420/417 |

(Continued)

FOREIGN PATENT DOCUMENTS

| DE | 1 558 816 | 3/1972 |
| EP | 1 114 876 A1 | 7/2001 |

(Continued)

OTHER PUBLICATIONS

European Search Report dated Nov. 16, 2017 in European Application 17177906.9, filed on Jun. 26, 2017 (with English Translation of Categories of cited documents).

*Primary Examiner* — Sean Kayes
(74) *Attorney, Agent, or Firm* — Oblon, McClelland, Maier & Neustadt, L.L.P.

(57) ABSTRACT

A spiral timepiece spring with a two-phase structure, made of a niobium and titanium alloy, and method for manufacturing this spring, including producing a binary alloy containing niobium and titanium, with niobium: the remainder to 100%; titanium between 45.0% and 48.0% by mass of the total, traces of components among O, H, C, Fe, Ta, N, Ni, Si, Cu, Al, of between 0 and 1600 ppm by mass of the total individually, and less than 0.3% by mass combined; applying deformations alternated with heat treatments until a two-phase microstructure is obtained including a solid solution of niobium with β-phase titanium and a solid solution of niobium with α-phase titanium, the α-phase titanium content being greater than 10% by volume, with an elastic limit higher than 1000 MPa, and a modulus of elasticity higher than 60 GPa and less than 80 GPa; wire drawing to obtain wire able to be calendered; calendering or winding.

26 Claims, 1 Drawing Sheet

US 10,795,317 B2
Page 2

(51) Int. Cl.
*C21D 1/18* (2006.01)
*C21D 9/02* (2006.01)
*C22C 14/00* (2006.01)
*C22C 27/02* (2006.01)
*F16F 1/02* (2006.01)
*F16F 1/10* (2006.01)
*G04B 17/22* (2006.01)

(52) U.S. Cl.
CPC .............. C22C 27/02 (2013.01); F16F 1/021 (2013.01); F16F 1/10 (2013.01); G04B 1/14 (2013.01); G04B 17/06 (2013.01); *F16F 2224/0208* (2013.01); *F16F 2234/06* (2013.01); *G04B 17/22* (2013.01); *G04B 17/227* (2013.01)

(58) Field of Classification Search
CPC .. F16F 1/10; F16F 2224/0208; F16F 2234/06; C22C 27/02; C22C 14/00; C21D 9/02; C21D 1/18
See application file for complete search history.

(56) References Cited

U.S. PATENT DOCUMENTS

| | | | | |
|---|---|---|---|---|
| 8,684,594 B2* | 4/2014 | Murakami | ............. | C21D 6/004 148/103 |
| 9,315,884 B2* | 4/2016 | Aljerf | ................. | C22C 1/002 |
| 9,395,692 B2* | 7/2016 | Hirai | ................. | C22C 38/002 |
| 10,048,649 B2* | 8/2018 | Charbon | ............. | C22C 38/38 |
| 10,338,529 B2* | 7/2019 | Balague | ............... | G04B 17/066 |
| 10,372,083 B2* | 8/2019 | Tobenas Borron | ......................... | C23C 16/45525 |
| 10,409,223 B2* | 9/2019 | Balague | ............... | G04B 17/063 |
| 2002/0180130 A1* | 12/2002 | Baur | .................... | G04B 17/227 267/156 |
| 2005/0072496 A1* | 4/2005 | Hwang | .................. | C22C 14/00 148/421 |
| 2007/0133355 A1* | 6/2007 | Hara | .................... | G04B 17/066 368/140 |
| 2011/0286312 A1* | 11/2011 | Murakami | ............. | C22C 38/44 368/175 |
| 2013/0133788 A1* | 5/2013 | Aljerf | .................... | G04B 1/145 148/548 |
| 2015/0185701 A1* | 7/2015 | Tobenas Borron | ..... | C23C 16/40 428/212 |
| 2015/0241847 A1* | 8/2015 | Hirai | ....................... | C22C 38/50 368/175 |
| 2016/0147195 A1* | 5/2016 | Charbon | ................ | G04B 1/145 368/140 |
| 2017/0351216 A1* | 12/2017 | Balague | ................. | G04B 17/34 |
| 2017/0351217 A1* | 12/2017 | Balague | ................. | G04B 17/345 |
| 2019/0196405 A1* | 6/2019 | Charbon | .................. | C22F 1/18 |
| 2019/0196406 A1* | 6/2019 | Charbon | ............. | G04B 17/063 |
| 2019/0196407 A1* | 6/2019 | Charbon | ............. | C23C 16/06 |
| 2019/0369561 A1* | 12/2019 | Balague | ............... | G04B 17/066 |

FOREIGN PATENT DOCUMENTS

| | | |
|---|---|---|
| EP | 1 114 876 B1 | 7/2001 |
| EP | 1 258 786 A1 | 11/2002 |

* cited by examiner

SPIRAL TIMEPIECE SPRING

This application claims priorities from European patent application No 17177906.9 of Jun. 27, 2017 and Swiss Patent Application No. 01593/17 of Dec. 21, 2017, the entire disclosures of which are hereby incorporated herein by reference.

FIELD OF THE INVENTION

The invention concerns a spiral timepiece spring, particularly a mainspring or a balance spring, with a two-phase structure.

The invention also concerns a method for manufacturing a spiral timepiece spring.

The invention concerns the field of manufacturing timepiece springs, in particular energy storage springs, such as mainsprings or motor springs or striking-work springs, or oscillator springs, such as balance springs.

BACKGROUND OF THE INVENTION

The manufacture of energy storage springs for horology is subject to constraints that often seem incompatible at first sight:
the need to obtain a very high elastic limit,
the need to obtain a low modulus of elasticity,
ease of manufacture, particularly of wire drawing,
excellent fatigue resistance,
durability,
small cross-sections,
arrangement of the ends: core hook and slipspring, with local weaknesses and difficulty in manufacture.

The production of balance springs is centred on the concern for temperature compensation, in order to ensure regular chronometric performance. This requires obtaining a thermoelastic coefficient that is close to zero.

Any improvement on at least one of these points, and in particular on the mechanical strength of the alloy used, thus represents a significant advance.

SUMMARY OF THE INVENTION

The invention proposes to define a new type of spiral timepiece spring, based on the selection of a particular material, and to develop the appropriate manufacturing method.

To this end, the invention concerns a spiral timepiece spring with a two-phase structure according to claim 1.

The invention also concerns a method for manufacturing such a spiral timepiece spring according to claim 9.

BRIEF DESCRIPTION OF THE DRAWINGS

Other features and advantages of the invention will appear upon reading the following detailed description, with reference to the annexed drawings, in which.

DETAILED DESCRIPTION OF PREFERRED EMBODIMENTS

Figure 1:
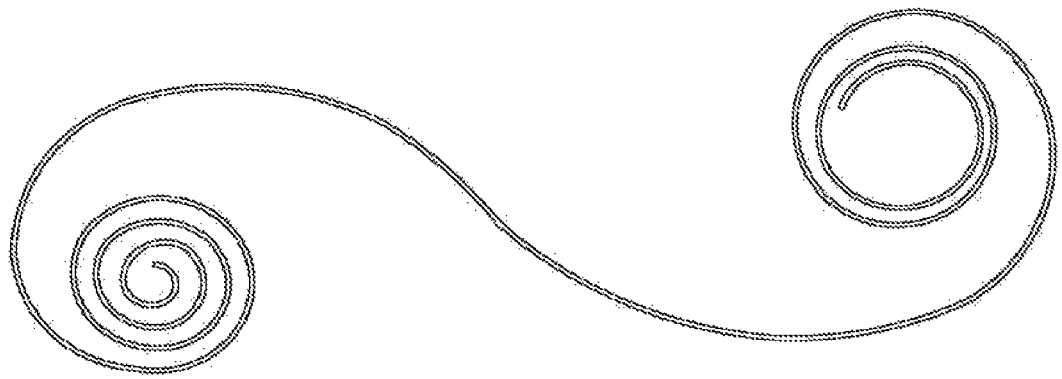
FIG. 1 represents a schematic, plan view of a mainspring, which is a spiral spring according to the invention, before it has been wound for the first time.
Figure 2:
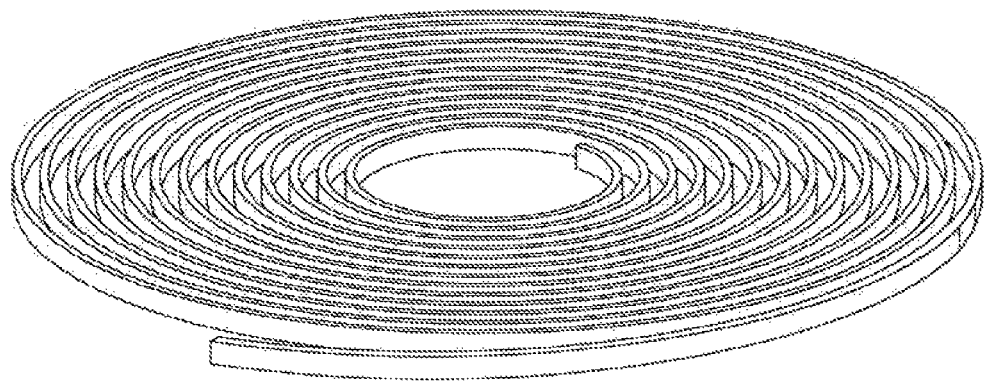
FIG. 2 represents a schematic view of a balance spring, which is a spiral spring according to the invention.
Figure 3:
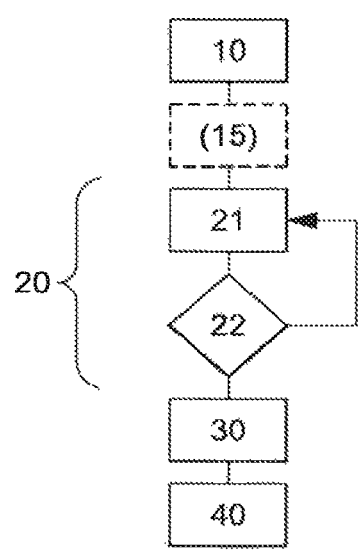
FIG. 3 represents the sequence of main operations of the method according to the invention.

The invention concerns a spiral timepiece spring with a two-phase structure.

According to the invention, the material of this spiral spring is a binary alloy containing niobium and titanium.

In an advantageous variant embodiment, this alloy contains:
niobium: the remainder to 100%;
a proportion by mass of titanium greater than or equal to 40.0% of the total and less than or equal to 60.0% of the total;
traces of other components among O, H, C, Fe, Ta, N, Ni, Si, Cu, Al, each of said trace components being comprised between 0 and 1600 ppm by mass of the total, and the sum of these traces being less than or equal to 0.3% by mass.

More particularly, this alloy includes a proportion by mass of titanium that is less than or equal to 45.0% of the total and less than or equal to 48.0% of the total.

Advantageously, this spiral spring has a two-phase microstructure containing β-phase body-centred cubic niobium and α-phase hexagonal close packed titanium. More particularly, this spiral spring has a two-phase structure comprising a solid solution of niobium with β-phase titanium (body-centred cubic structure) and a solid solution of niobium with α-phase titanium (hexagonal close packed structure), wherein the α-phase titanium content is greater than 10% by volume.

To obtain a structure of this type that is suitable for producing a spring, part of the α-phase must be precipitated by heat treatment.

The higher the titanium content, the higher the maximum proportion of α-phase that can be precipitated by heat treatment, which is an incentive to seek a high titanium proportion. However, conversely, the higher the titanium content, the more difficult it is to obtain precipitation only of the α-phase at the grain boundary intersections. The appearance of intragranular α-phase or intragranular ω-phase precipitates with Widmanstätten structures makes it difficult or impossible to deform the material, which is thus unsuitable for manufacturing a spiral spring, and therefore too much titanium should not be incorporated in the alloy. The development of the invention has allowed a compromise to be determined, with an optimum between these two characteristics close to 47% of titanium.

Thus, more particularly, the proportion by mass of titanium is greater than or equal to 46.5% of the total.

More particularly, the proportion by mass of titanium is less than or equal to 47.5% of the total.

In an alternative, the remainder to 100% of the total by mass is titanium, and the proportion by mass of niobium is greater than or equal to 51.7% of the total and less than or equal to 55.0% of the total.

In another variant composition, the proportion by mass of titanium is greater than or equal to 46.0% of the total and less than or equal to 50.0% of the total.

In yet another variant composition, the proportion by mass of titanium is greater than or equal to 53.5% of the total and less than or equal to 56.5% of the total, and the proportion by mass of niobium is greater than or equal to 43.5% of the total and less than or equal to 46.5% of the total.

More particularly, in each variant, the total proportion by mass of titanium and niobium is comprised between 99.7% and 100% of the total.

More particularly, the proportion by mass of oxygen is less than or equal to 0.10% of the total, or less than or equal to 0.085% of the total.

More particularly, the proportion by mass of tantalum is less than or equal to 0.10% of the total.

More particularly, the proportion by mass of carbon is less than or equal to 0.04% of the total, in particular less than or equal to 0.020% of the total, or less than or equal to 0.0175% of the total.

More particularly, the proportion by mass of iron is less than or equal to 0.03% of the total, in particular less than or equal to 0.025% of the total, or less than or equal to 0.020% of the total.

More particularly, the proportion by mass of nitrogen is less than or equal to 0.02% of the total, in particular less than or equal to 0.015% of the total, or less than or equal to 0.0075% of the total.

More particularly, the proportion by mass of hydrogen is less than or equal to 0.01% of the total, in particular less than or equal to 0.0035% of the total, or less than or equal to 0.0005% of the total.

More particularly, the proportion by mass of nickel is less than or equal to 0.01% of the total.

More particularly, the proportion by mass of silicon is less than or equal to 0.01% of the total.

More particularly, the proportion by mass of nickel is less than or equal to 0.01% of the total, in particular less than or equal to 0.16% of the total.

More particularly, the proportion by mass of the ductile material or copper is less than or equal to 0.01% of the total, less than or equal to 0.005% of the total.

More particularly, the proportion by mass of aluminium is less than or equal to 0.01% of the total.

This spiral spring has an elastic limit higher than or equal to 1000 MPa.

More particularly, the spiral spring has an elastic limit higher than or equal to 1500 MPa.

More particularly still, the spiral spring has an elastic limit higher than or equal to 2000 MPa.

Advantageously, this spiral spring has a modulus of elasticity higher than 60 GPa and less than or equal to 80 GPa.

Depending on the treatment applied during manufacture, the alloy thus determined allows the production of spiral springs which are balance springs with an elastic limit higher than or equal to 1000 MPa, or mainsprings, particularly when the elastic limit is higher than or equal to 1500 MPa.

Application to a balance spring requires properties that can ensure chronometric performance is maintained despite the variation in temperature during use of a watch incorporating such a balance spring. The thermoelastic coefficient, of the alloy, said TEC in english, is therefore of great importance. The cold-worked β-phase of the alloy has a strongly positive thermoellastic coefficient, and precipitation of the α-phase that has a strongly negative thermoelastic coefficient allows the two-phase alloy to be brought to a thermoelastic coefficient close to zero, which is particularly advantageous. To form a chronometric oscillator with a balance made of CuBe or of nickel silver, a thermoelastic coefficient of +/−10 ppm/° C. must be attained. The formula that links the thermoelastic coefficient of the alloy and the expansion coefficients of the balance spring and the balance is as follows:

$$CT = \frac{dM}{dT} = \left(\frac{1}{2E}\frac{dE}{dT} - \beta + \frac{3}{2}\alpha\right) \times 86400 \frac{s}{j° C.}$$

Variables M and T are respectively rate and temperature. E is the Young's modulus of the balance spring, and, in this formula, E, ρ and a are expressed in ° C.$^{-1}$. CT is the temperature coefficient of the oscillator (usually TC in English), (1/E. dE/dT) is the thermoelastic coefficient of the balance spring alloy, β is the expansion coefficient of the balance and a that of the balance spring.

The invention further concerns a method for manufacturing a spiral timepiece spring, characterized in that the following steps are implemented in succession:

(10) producing a blank from an alloy containing niobium and titanium, which is a binary alloy containing niobium and titanium, and which contains:
niobium: the remainder to 100%;
a proportion by mass of titanium greater than or equal to 45.0% of the total and less than or equal to 48.0% of the total,
traces of other components among O, H, C, Fe, Ta, N, Ni, Si, Cu, Al, each of said trace components being comprised between 0 and 1600 ppm by mass of the total, and the sum of said traces being less than or equal to 0.3% by mass;

(20) applying to said alloy pairs of deformation/precipitation heat treatment sequences, comprised of the application of deformations alternated with heat treatments, until a two-phase microstructure is obtained comprising a solid solution of niobium with β-phase titanium and a solid solution of niobium with α-phase titanium, the α-phase titanium content being greater than 10% by volume, with an elastic limit higher than or equal to 1000 MPa, and a modulus of elasticity higher than 60 GPa and less than or equal to 80 GPa;

(30) wire drawing to obtain a wire of round cross-section, and rectangular profile unformed rolling compatible with the entry cross-section of a roller press or of a winder arbor, or in the case of a mainspring ready to be winded up and inserted in a ring for further treatment operations;

(40) forming coils in the shape of a treble clef to form a mainspring prior to its first winding, or winding to form a balance spring, or insertion in a ring and heat treatment to form a mainspring.

In particular, there is applied to this alloy pairs of deformation/precipitation heat treatment sequences 20 comprising the application of deformations (21) alternated with heat treatments (22), until a two-phase microstructure is obtained comprising a solid solution of niobium with β-phase titanium and a solid solution of niobium with α-phase titanium, the α-phase titanium content being greater than 10% by volume, with an elastic limit higher than or equal to 2000 MPa. More particularly, the treatment cycle in this case includes a prior beta-quenching treatment (15) at a given diameter, such that the entire structure of the alloy is beta, then a succession of the pairs of deformation/precipitation heat treatment sequences.

In these pairs of deformation/precipitation heat treatment sequences, each deformation is carried out with a given deformation rate comprised between 1 and 5, wherein the deformation rate answers the conventional formula 2 ln(d0/d), where d0 is the diameter of the last beta-quenching, and where d is the diameter of the cold worked wire. The overall accumulation of deformations over the entire succession of phases gives a total deformation rate comprised between 1 and 14. Every pair of deformation/precipitation heat treatment sequences includes, each time, a precipitation heat treatment of the α-phase Ti (300-700° C., 1 h-30 h).

This variant of the method including beta-quenching is particularly suited to the manufacture of mainsprings. More particularly, this beta-quenching is a solution treatment, with a duration comprised between 5 minutes and 2 hours at a temperature comprised between 700° C. and 1000° C., under vacuum, followed by gas cooling.

More particularly still, the beta-quenching is a solution treatment, with 1 hour at 800° C. under vacuum, followed by gas cooling.

To return to the pairs of deformation/precipitation heat treatment sequences, more particularly each pair of deformation/precipitation heat treatment sequences includes a precipitation heat treatment of a duration comprised between 1 hour and 80 hours at a temperature comprised between 350° C. and 700° C. More particularly, the duration is comprised between 1 hour and 10 hours at a temperature comprised between 380° and 650° C. More particularly still, the duration is from 1 hour to 12 hours, at a temperature of 380° C. Preferably, long heat treatments are applied, for example heat treatments performed for a duration comprised between 15 hours and 75 hours at a temperature comprised between 350° C. and 500° C. For example, heat treatments are applied from 75 hours to 400 hours at 350° C., for 25 hours at 400° C. or for 18 hours at 480° C.

More particularly, the method includes between one and five, and preferably from three to five, pairs of deformation/precipitation heat treatment sequences.

More particularly, the first pair of deformation/precipitation heat treatment sequences includes a first deformation with at least a 30% reduction in cross-section.

More particularly, each pair of deformation/precipitation heat treatment sequences, apart from the first, includes one deformation between two precipitation heat treatments with at least a 25% reduction in cross-section.

More particularly, after producing said alloy blank, and prior to wire drawing, in an additional step 25, a surface layer of ductile material is added to the blank, chosen from among copper, nickel, cupronickel, cupro manganese, gold, silver, nickel-phosphorus Ni—P and nickel-boron Ni—B, or similar, to facilitate shaping by drawing, wire drawing and unformed rolling. After wire drawing, or after unformed rolling, or after a subsequent calendering, pressing, or winding operation, or insertion in a ring and heat treatment in the case of a mainspring, the layer of ductile material is removed from the wire, particularly by etching, in a step 50.

For the mainspring, it is, in fact, possible to perform the manufacturing by insertion in a ring and heat treatment, where the insertion in a ring operation replaces calendering. The mainspring is generally also heat treated after insertion in a ring or after calendering.

A balance spring is generally also heat treated after winding.

More particularly, the last deformation phase takes the form of flat unformed rolling, and the last heat treatment is performed on the calendered or inserted in a ring or wound spring. More particularly, after wire drawing, the wire is rolled flat, before the actual spring is produced by calendering or winding or insertion in a ring.

In a variant, the surface layer of ductile material is deposited to form a balance spring whose pitch is not a multiple of the thickness of the strip. In another variant, the surface layer of ductile material is deposited to form a spring whose pitch is variable.

In a particular horological application, ductile material or copper is thus added at a given time to facilitate the shaping of the wire by drawing and wire drawing, so that there remains a thickness of 10 to 500 micrometres on the wire at the final diameter of 0.3 to 1 millimetre. The layer of ductile material or copper is removed from the wire, particularly by etching, and is then rolled flat before the actual spring is produced.

The addition of ductile material or copper may be a galvanic or mechanical process, it is then a sleeve or tube of ductile material or copper which is fitted to a niobium-titanium alloy bar with a rough diameter, and then thinned out during the steps of deforming the composite bar.

The layer can be removed, in particular by etching, with a cyanide or acid-based solution, for example nitric acid.

The invention thus makes it possible to produce a spiral mainspring made of a niobium-titanium alloy, typically with 47% by mass of titanium (46-50%). With a suitable combination of deformation and heat treatment steps, it is possible to obtain a very thin, lamellar, two-phase microstructure (particularly a nanosized microstructure), comprising a solid solution of niobium with β-phase titanium and a solid solution of niobium with α-phase titanium, the α-phase titanium content being greater than 10% by volume. This alloy combines a very high elastic limit, at least higher than 1000 MPa, or higher than 1500 MPa, or even 2000 MPa for the wire, and a very low modulus of elasticity, on the order of 60 GPa to 80 GPa. This combination of properties is very suitable for a mainspring or a balance spring. This niobium-titanium alloy can easily be coated with ductile material or copper, which greatly facilitates deformation by wire drawing.

Such an alloy is known and used for the manufacture of superconductors, such as magnetic resonance imaging devices, or particle accelerators, but is not used in horology. Its thin, two-phase microstructure is desired in the case of superconductors for physical reasons and has the welcome side effect of improving the mechanical properties of the alloy.

A NbTi47 type alloy is particularly suitable for producing a mainspring, and also for producing balance springs.

A binary alloy containing niobium and titanium, of the type mentioned above for implementation of the invention, is also capable of being used as a spiral wire; it has a similar effect to that of Elinvar, with a virtually zero thermoelastic coefficient within the usual operating temperature range of watches, and is suitable for the manufacture of temperature compensating balance springs, in particular for niobium-titanium alloys with a proportion by mass of titanium of 40%, 50% or 65%.

The composition selection according to the invention was, moreover, required for the superconducting application and is advantageous because of the titanium content, which avoids the drawbacks:
of alloys containing too much titanium, where a martensitic phase appears, and where shaping difficulties are encountered;
alloys containing too little titanium, which result in less alpha phase during the precipitation heat treatment(s).

The shaping of an unformed pre-drawn wire of a balance spring means avoiding high titanium alloys, and the need to achieve temperature compensation means avoiding low titanium alloys.

What is claimed is:
1. A spiral spring with a two-phase structure, wherein the material of said spiral spring is a binary alloy comprising niobium and titanium, and which comprises:
niobium: the remainder to 100%;
a proportion by mass of titanium greater than or equal to 45.0 of the total and less than or equal to 48.0% of the total;

traces of other components among O, H, C, Fe, Ta, N, Ni, Si, Cu, Al, each of said trace components being comprised between 0 and 1600 ppm of the total by mass, and the sum of said traces being less than or equal to 0.3% by mass.

2. The spiral spring according to claim 1, wherein the total proportion by mass of titanium and niobium is comprised between 99.7% and 100% of the total.

3. The spiral spring according to claim 1, wherein the proportion by mass of titanium is greater than or equal to 46.0/%.

4. A spiral spring with a two-phase structure, wherein the material of said spiral spring is a binary alloy comprising niobium and titanium, and which comprises:
   niobium: the remainder to 100%;
   a proportion by mass of titanium greater than or equal to 40.0% of the total and less than or equal to 60.0% of the total;
   traces of other components among O, H, C, Fe, Ta, N, Ni, Si, Cu, Al, each of said trace components being comprised between 0 and 1600 ppm of the total by mass, and the sum of said traces being less than or equal to 0.3% by mass,
   wherein said spiral spring has a two-phase microstructure comprising a solid solution of niobium with β-phase titanium and a solid solution of niobium with α-phase titanium, the α-phase titanium content being greater than 10% by volume.

5. The spiral spring according to claim 1, wherein the proportion by mass of titanium is greater than or equal to 46.5% and less than or equal to 48.0% of the total.

6. The spiral spring according to claim 1, wherein the proportion by mass of titanium is less than or equal to 47.5% of the total.

7. The spiral spring according to claim 1, wherein said spiral spring is a mainspring.

8. The spiral spring according to claim 1, wherein said spiral spring is a balance spring.

9. The spiral spring according to claim 4, wherein the proportion by mass of titanium is greater than or equal to 45.0% and less than or equal to 48.0% of the total.

10. The spiral spring according to claim 4, wherein the proportion by mass of titanium is greater than or equal to 46.0%.

11. The spiral spring according to claim 4, wherein the proportion by mass of titanium is greater than or equal to 46.5° % and less than or equal to 48.0% of the total.

12. The spiral spring according to claim 4, wherein the proportion by mass of titanium is less than or equal to 47.5% of the total.

13. A method for manufacturing a spiral timepiece spring, comprising, in the following order:
   producing a blank from a binary alloy comprising niobium and titanium, and which comprises:
      niobium: the remainder to 100%;
      a proportion by mass of titanium greater than or equal to 45.0% of the total and less than or equal to 48.0% of the total,
      traces of other components among O, H, C, Fe, Ta, N, Ni, Si, Cu, Al, each of said trace components being comprised between 0 and 1600 ppm by mass of the total, and the sum of said traces being less than or equal to 0.3% by mass;
   performing a treatment cycle including a prior beta-quenching treatment to a given diameter, such that the entire structure of the alloy is beta, then a succession of the pairs of deformation/precipitation heat treatment sequences, comprising the application of deformations alternating with heat treatments until a two-phase microstructure is obtained comprising a solid solution of niobium with β-phase titanium and a solid solution of niobium with α-phase titanium, the α-phase titanium content being greater than or equal 10% by volume, with an elastic limit higher than or equal to 1000 MPa, and a modulus of elasticity higher than 60 GPa and less than or equal to 80 GPa;
   wire drawing to obtain a wire of round cross-section, and rectangular profile unformed rolling compatible with the entry cross-section of a calender roller press or of a winder arbor, or with a insertion in a ring operation; and
   forming coils in the shape of a treble clef to form a mainspring prior to its first winding, or winding to form a balance spring, or insertion in a ring and heat treatment to form a mainspring.

14. The method for manufacturing a spiral spring according to claim 13, wherein the last deformation phase is carried out in the form of flat unformed rolling, and wherein the last heat treatment is performed on the calendered or inserted in a ring or wound spring.

15. The method for manufacturing a spiral spring according to claim 13, wherein there is applied to said alloy pairs of deformation precipitation heat treatment sequences, including the application of deformations alternating with heat treatments until a two-phase microstructure is obtained comprising a solid solution of niobium with β-phase titanium and a solid solution of niobium with α-phase titanium, the α-phase titanium content being greater than 10% by volume, with an elastic limit higher than or equal to 2000 MPa, the treatment cycle including beta-quenching at a given diameter, such that the entire structure of the alloy is beta, then a series of said pairs of deformation/precipitation heat treatment sequences, wherein each deformation is performed with a given deformation rate comprised between 1 and 5, the overall accumulation of deformations over the entire series of phases giving a total deformation rate comprised between 1 and 14, and which includes each time a precipitation heat treatment of the alpha phase Ti.

16. The method for manufacturing a spiral spring according to claim 15, wherein said beta-quenching is a solution treatment, with a duration comprised between 5 minutes and 2 hours at a temperature comprised between 700° C. and 1000° C., under vacuum, followed by gas cooling.

17. The method for manufacturing a spiral spring according to claim 16, wherein said beta-quenching is a solution treatment, with 1 hour at 800° C., under vacuum, followed by gas cooling.

18. The method for manufacturing a spiral spring according to claim 13, wherein each pair of deformation/precipitation heat treatment sequences includes a precipitation treatment with a duration comprised between 1 hour and 80 hours at a temperature comprised between 350° C. and 700° C.

19. The method for manufacturing a spiral spring according to claim 18, wherein each pair of deformation/precipitation heat treatment sequences includes a precipitation treatment with a duration comprised between 1 hour and 10 hours at a temperature comprised between 380° C. and 650° C.

20. The method for manufacturing a spiral spring according to claim 19, wherein each pair of deformation/precipitation heat treatment sequences includes a precipitation treatment with a duration of between 1 hour and 12 hours at 450° C.

21. The method for manufacturing a spiral spring according to claim 13, wherein said method includes between one and five of said pairs of deformation/precipitation heat treatment sequences.

22. The method for manufacturing a spiral spring according to claim 13, wherein said first pair of deformation/precipitation heat treatment sequences includes a first deformation with an at least 30% reduction in cross-section.

23. The method for manufacturing a spiral spring according to claim 22, wherein each said pair of deformation/precipitation heat treatment sequences, apart from the first, includes one deformation between two precipitation heat treatments with at least a 25% reduction in cross-section.

24. The method for manufacturing a spiral spring according to claim 13, wherein, after producing said alloy blank, and prior to said wire drawing, there is added to said blank a surface layer of ductile material taken from nickel, cupronickel, cupro manganese, gold, silver, nickel-phosphorus Ni—P and nickel-boron Ni—B, or similar, to facilitate shaping by drawing, wire drawing and unformed rolling, and wherein, after said wire drawing, or after said unformed rolling, or after a subsequent calendering, pressing, or winding or insertion in a ring operation, said layer of ductile material is removed from said wire by etching.

25. The method for manufacturing a spiral spring according to claim 24, wherein, after said wire drawing, said wire is rolled flat, before the actual spring is produced by calendering or winding or insertion in a ring.

26. The method for manufacturing a spiral spring according to claim 24, wherein said surface layer of ductile material is deposited to form a spring whose pitch is constant and is not a multiple of the thickness of the strip.

\* \* \* \* \*

UNITED STATES PATENT AND TRADEMARK OFFICE
CERTIFICATE OF CORRECTION

| | | |
|---|---|---|
| PATENT NO. | : 10,795,317 B2 | Page 1 of 1 |
| APPLICATION NO. | : 16/012274 | |
| DATED | : October 6, 2020 | |
| INVENTOR(S) | : Christian Charbon | |

It is certified that error appears in the above-identified patent and that said Letters Patent is hereby corrected as shown below:

In the Specification

In Column 1, Line 4 (approx.), "Jun. 27," should read -- Jun. 26, --.

In the Claims

In Column 6, Line 66, Claim 1, "45.0" should read -- 45.0% --.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*